(12) United States Patent
Gagnon et al.

(10) Patent No.: US 6,178,868 B1
(45) Date of Patent: Jan. 30, 2001

(54) EXTERNAL PNEUMATIC CUSHION SYSTEM FOR AIR CYLINDER

(75) Inventors: André Gagnon, Chicoutimi; Gilles Harvey, Jonquière, both of (CA)

(73) Assignee: Denis Comact Chicoutimi, Inc., Quebec (CA)

( * ) Notice: Under 35 U.S.C. 154(b), the term of this patent shall be extended for 0 days.

(21) Appl. No.: 09/307,904

(22) Filed: May 10, 1999

(51) Int. Cl.⁷ ........................................ F15B 13/04
(52) U.S. Cl. ................... 91/404; 92/85 B; 60/414
(58) Field of Search ............... 91/392, 404, 462, 91/465; 92/13.5, 85 B; 60/414

(56) References Cited

U.S. PATENT DOCUMENTS

| | | | |
|---|---|---|---|
| 4,022,269 | * 5/1977 | Segawa | 91/392 |
| 4,206,687 | 6/1980 | Klaus et al. | 91/395 |
| 4,460,324 | 7/1984 | Van Appledorn | 425/166 |
| 4,635,466 | 1/1987 | Seki et al. | 72/453 |
| 5,034,184 | 7/1991 | Stevens et al. | 376/231 |
| 5,120,489 | 6/1992 | Dülmann | 376/230 |
| 5,140,895 | 8/1992 | Imanishi | 91/361 |
| 5,295,383 | 3/1994 | Kirii et al. | 72/351 |
| 5,299,444 | 4/1994 | Kirii et al. | 72/453 |
| 5,312,315 | 5/1994 | Mortensen et al. | 482/113 |
| 5,687,598 | 11/1997 | Kirii et al. | 72/21.5 |
| 5,706,713 | 1/1998 | Lim | 91/361 |

* cited by examiner

Primary Examiner—Edward K. Look
Assistant Examiner—Hermes Rodriguez
(74) Attorney, Agent, or Firm—W. Warren Taltavull; Farkas & Manelli PLLC

(57) ABSTRACT

A system by which the air exhausted from either end of a pneumatic cylinder is directed, by an arrangement of control valves, to external surge tanks of appropriate volume where it is compressed to produce a deceleration effect at the end of each stroke before being released to the atmosphere.

6 Claims, 4 Drawing Sheets

EXTERNAL PNEUMATIC CUSHION SYSTEM FOR AIR CYLINDER

FIELD OF THE INVENTION

The present invention relates to a decelerating pneumatic circuit for air cylinders used in automated processes.

BACKGROUND OF THE INVENTION

In most applications, air cylinders are used to achieve the sliding, turning or upward and downward motions of some machine component or external load to be processed. In certain lumber making operations cylinder stroking at high speed and frequency is called for where the inertial resistance of the displaced load may be high in relation to the cylinder size.

One concrete example is the case of a lumber trimming saw assembly which, in the modern context of production, must be lowered and lifted by a pneumatic cylinder a number of times per second, through a vertical distance of several inches. Up to very few years ago, the maximum cycling frequency of such an assembly was of the order of 90 cuts per minute, whereas present day applications reach up to twice that number. It can be estimated that, in a high speed lumber trimming application, an industrial class pneumatic cylinder equipped with standard built-in cushions would not last more than a few work shifts before requiring parts replacements. The production losses and the extra maintenance caused by cylinder break-down in the lumber trimming phase is compounded by the number of saw units involved (up to seventeen) in a mill producing 6' to 16' lumber with the option of selective trimming in odd or even foot lengths. Since every sawmill must have a trimming operation of sufficient capacity and versatility for the total production and all market requirements, it follows that in order to meet operating conditions, an efficient and reliable means of cushioning the saw cylinder at the end of each stroke becomes a matter of necessity.

Other cylinder cushioning options, such as resilient inserts to prevent metal-to-metal contact of the piston with the cylinder heads, have not proven satisfactory in high cycling operations as the repetitive hammering within the cylinder causes a rapid break-down of the inserts which finally disintegrate and foul-up the valve circuit.

Another cushioning method consists of increasing the compression volume within the cylinder itself, by extending the barrel length beyond the actual piston travel requirements. This can be effective in some applications but not whenever exact positioning of the load at stroke end is necessary, such as in the field of application mentioned above.

OBJECTS AND STATEMENT OF THE INVENTION

It is therefore an object of the present invention to provide an efficient and reliable means of cushioning an air cylinder at each stroke by preventing any impact of the piston with either end of the cylinder.

It is also an object of the present invention to provide a cushioning system as a valuable tool in meeting the requirements of the lumber industry, among others, for high speed and high cycling displacement of inertial loads by means of pneumatic cylinders.

This is achieved by providing a pneumatic valve arrangement controlled by external electrical signals, combined in some applications with additional signals from load position sensors, and comprising pressure surge tanks connected by the valves in such a way as to compress the exhaust flow from the cylinder into said surge tanks and thus cause a deceleration of the cylinder load either throughout the stroke or at the end of it, thus preventing piston impact and cylinder damage. The valve arrangement also causes final exhausting to the atmosphere of the pressure built up at each stroke in the corresponding surge tank so that there is no heat or pressure accumulation at any cycling frequency. The load position sensors may be incorporated in the system to allow valve sequencing causing piston deceleration at any point of its travel, in cases where it would not be efficient to initiate such deceleration from the external signal at the beginning of the stroke.

The present invention therefore defines a system for producing a deceleration at either or both ends of the piston stroke, in a fast actuating, double acting air cylinder, the system broadly comprising:

a) an air pressure supply line to the pressure/exhaust ports of the cylinder;

b) control valve means in the supply line causing piston travel and stroke reversal on receipt of an electrical signal; and c) an exhaust circuit for each cylinder port including a pressure surge tank; admission and venting valve means connected to the surge tank; the admission and venting valve means causing back pressure to be applied against the piston travel or vented to the atmosphere on receipt of an electrical signal;

the control valve means and the admission and venting valve means causing start and reversal of the piston travel and a controlled deceleration thereof.

In some form of the invention, the system may further comprise signal means consisting of positionally adjustable load position sensors to independently cause the closing of the venting valve means on either pressure surge tank to thereby initiate deceleration at any selected point of the piston travel rather than at the start of this travel.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
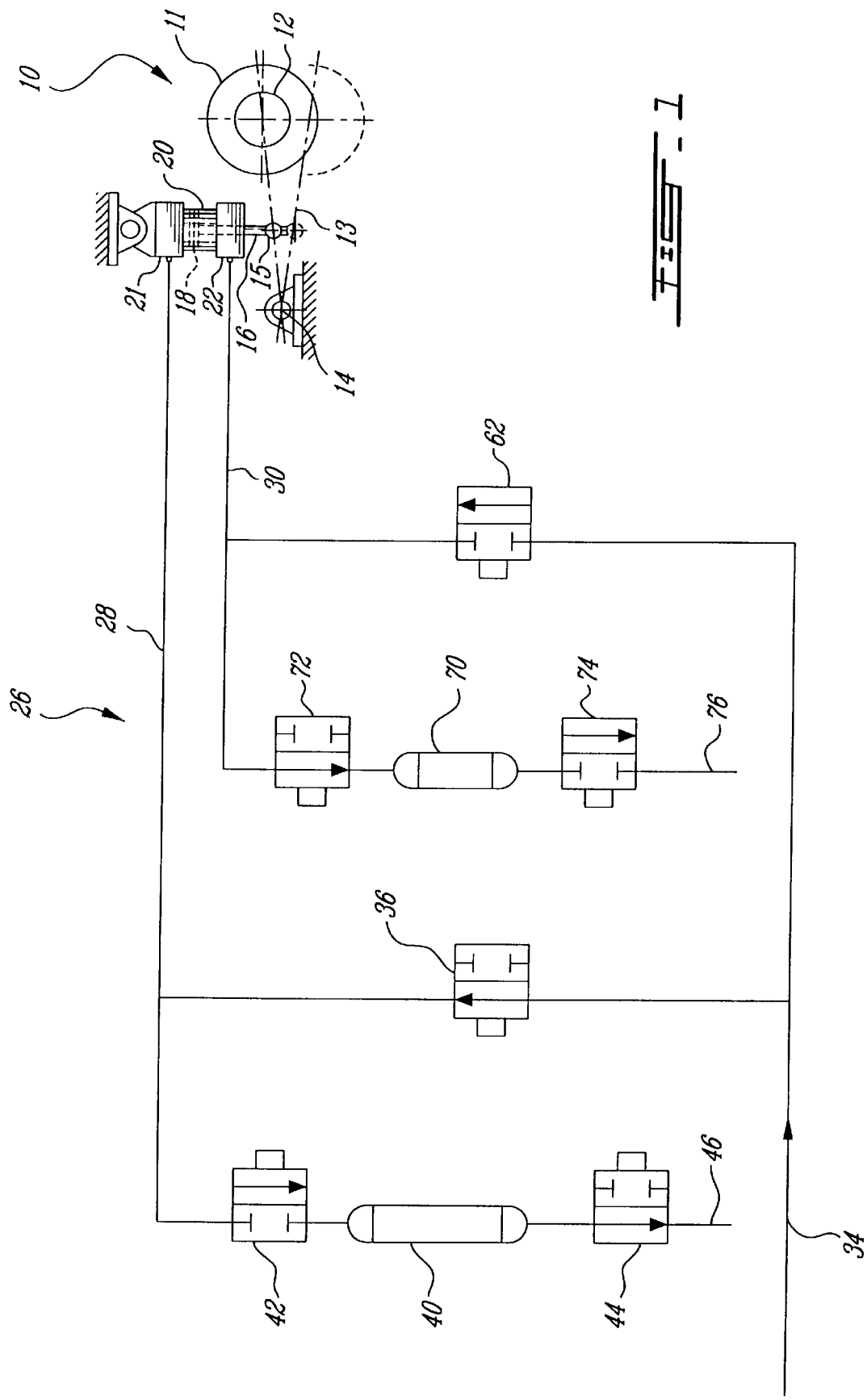
FIG. 1 is a diagram showing the pneumatic control circuit with single function valves.

Referring to FIG. 1, there is shown a trimming saw assembly, generally designated 10, as used in the lumber industry. It comprises a saw 11, a saw motor 12 and a pivoting frame 13 mounted to a fixed pivoting axis 14 in a manner that it may be moved between upper and lower positions by air cylinder 20.

External cylinder rod 16 connects the piston 18 to frame 13 through a rod clevis 15. The cylinder has inlet/outlet ports 21 and 22 for admission of pneumatic pressure and exhaust.

The present invention is concerned with providing for cylinder 20 an external pneumatic cushion system generally denoted 26. One preferred form shown in FIG. 1 first consists of pressure/exhaust lines 28 and 30 connected to cylinder ports 21 and 22.

Line 28 is connected to air pressure supply line 34 through a solenoid operated "open-shut" valve 36. Line 28 also extends to a deceleration group comprising pressure surge tank 40 disposed between an "open-shut" admission valve 42 and a venting valve 44.

The circuit which comprises line 30 is identical to the one just described relating to line 28. Pressure is fed through "open-shut" valve 62, from pressure supply line 34. The deceleration group includes a pressure surge tank 70 disposed between admission and venting valves 72 and 74 respectively.

As can be noted, pressure surge tanks 40 and 70 are of different sizes basically to compensate for the volume difference between the rod end and blank end of the cylinder; however, this can also reflect an operating requirement for a higher decelerating force at one end of the stroke relatively to the other.

An operating sequence of the circuit of the present invention in its preferred embodiment will now be described.

As already stated, the purpose of this invention is to allow a pneumatic cylinder to move a mass at high speed with fully cushioned stops at either or both ends of each stroke and thus prevent mechanical damage to the cylinder's internal components. Referring again to FIG. 1 showing the system of the invention connected to a cylinder 20 actuating a lumber trimming saw 11, one complete cycle of lowering the saw into the cut and retracting it to its idling position will be examined in terms of valve functions and mechanical action.

On receipt of a single external electrical signal, such as produced by a limit switch, photo-electric cell, an operator actuating a switch, or a signal source controlled by computer (in the case of a complete production system) the following simultaneous valve positions are set and held throughout the "down" travel of the piston:

a) on receipt of said electrical signal, cylinder port 21 is open to pressure line 34 through valve 36 to start the downward stroke;

b) surge tank 40 is blocked out of the circuit by closed valve 42 while venting at 46, through valve 44, the residual pressure from the previous "up" stroke;

c) cylinder port 22 is shut off from pressure line 34 by valve 62;

d) cylinder port 22 is open to surge tank 70 through valve 72;

e) surge tank 70 is prevented from exhausting at 76 by closed valve 74 and builds up back pressure against piston 18 to cause a smooth end of stroke stop.

The return (or "up") stroke which follows comprises the exact counterpart of the valve positions illustrated in FIG. 1. This alternative positioning of the valves is triggered by a second electrical signal usually from the same source which initiated the "down" stroke procedure just described.

Figure 2:
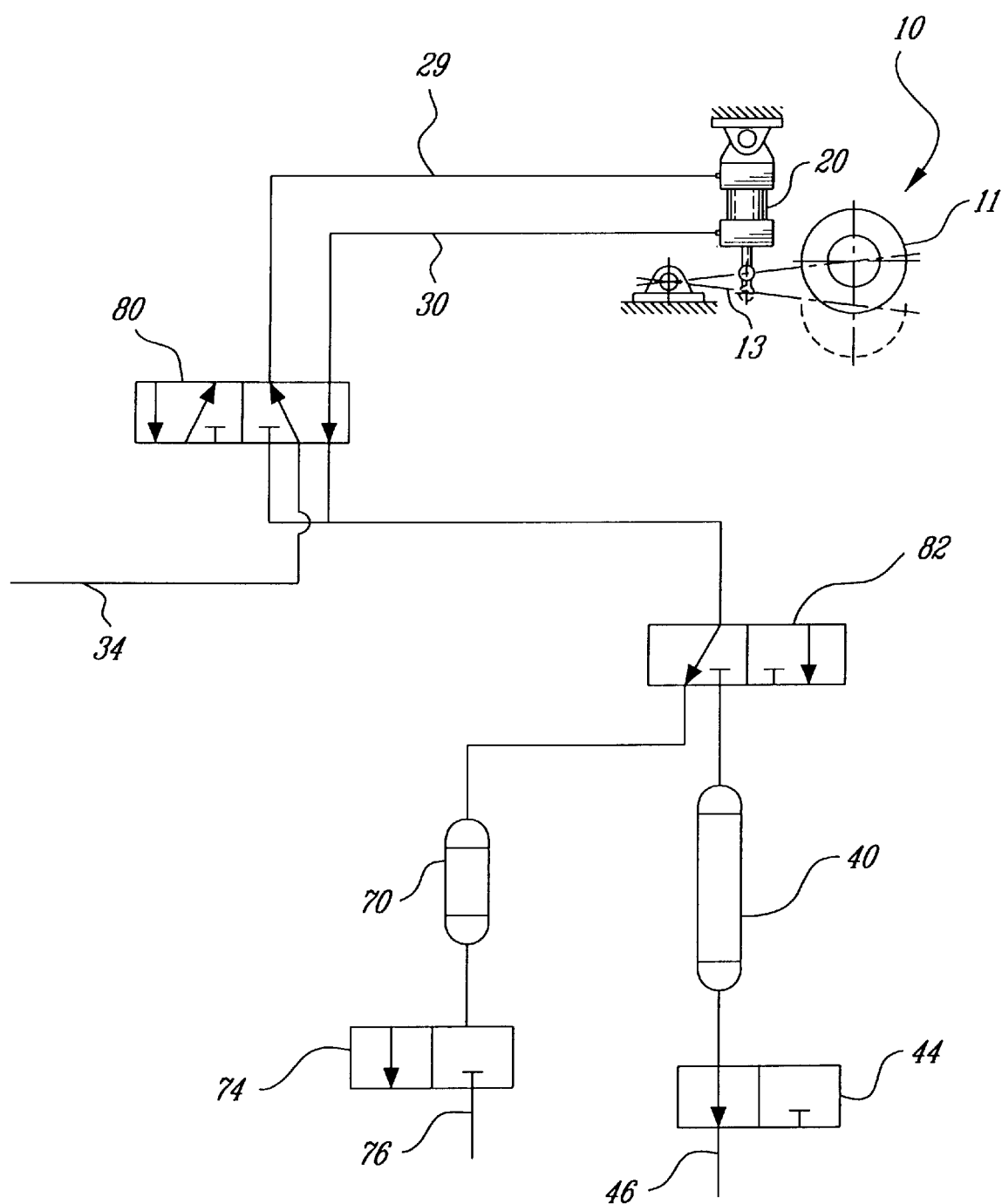
FIG. 2 is a diagram showing the pneumatic control circuit with some multiple function valves.

FIG. 2 relates to a variation of the embodiment of FIG. 1, in which some of the single function valves are replaced by multiple function valves. Referring to both figures mentioned, it can be seen that the functions of four two-way "open-shut" valves (42, 36, 72, 62, FIG. 1) are performed in FIG. 2 by two four-way directional valves 80, 82). As in the embodiment of FIG. 1, piston movement is initiated, in either direction, by an outside electrical signal and deceleration occurs simultaneously with the start of stroke. While simplifying the control circuit, this valve substitution prevents any sequencing of the decelerating process with regard to the start of piston travel. However, in some short stroke applications, such as in lumber trimming, the loss of this control option is not detrimental to the efficiency of the operation and the cost savings could be the dominating factor in the choice of control systems.

Figure 3:
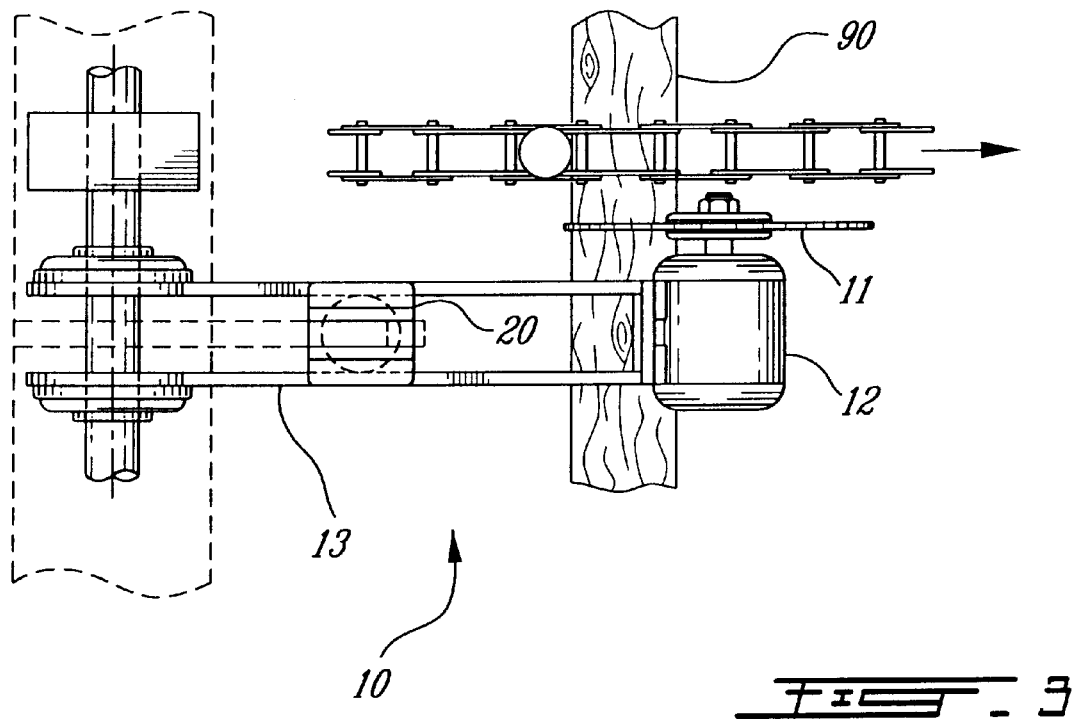
FIG. 3 is a top plan view of a lumber trim saw assembly.
Figure 4:
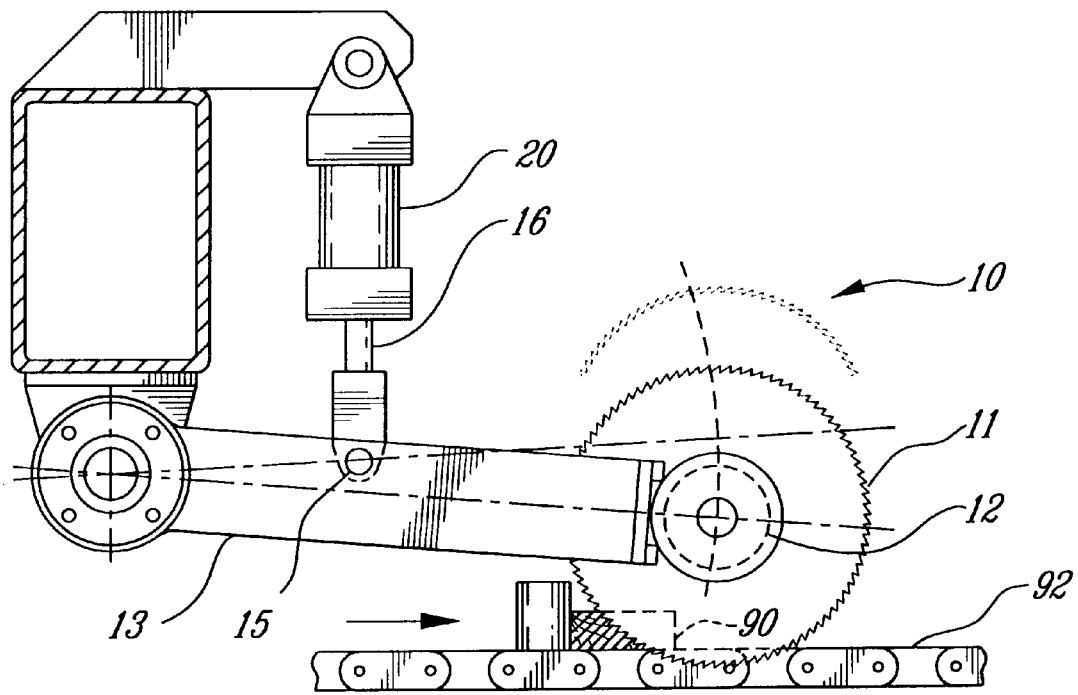
FIG. 4 is a side elevation view of the lumber trim saw assembly of FIG. 3.

FIGS. 3 and 4 show respectively a plan and a side elevation view of a lumber trimming saw assembly 10 comprising a saw 11, a pivoting frame 13 and an actuating cylinder 20. In both figures the saw 11, driven by motor 12, is shown in engagement with a piece of lumber 90 being moved through the cut by parallel feeding chains 92 (only one of which is shown).

Figure 5:
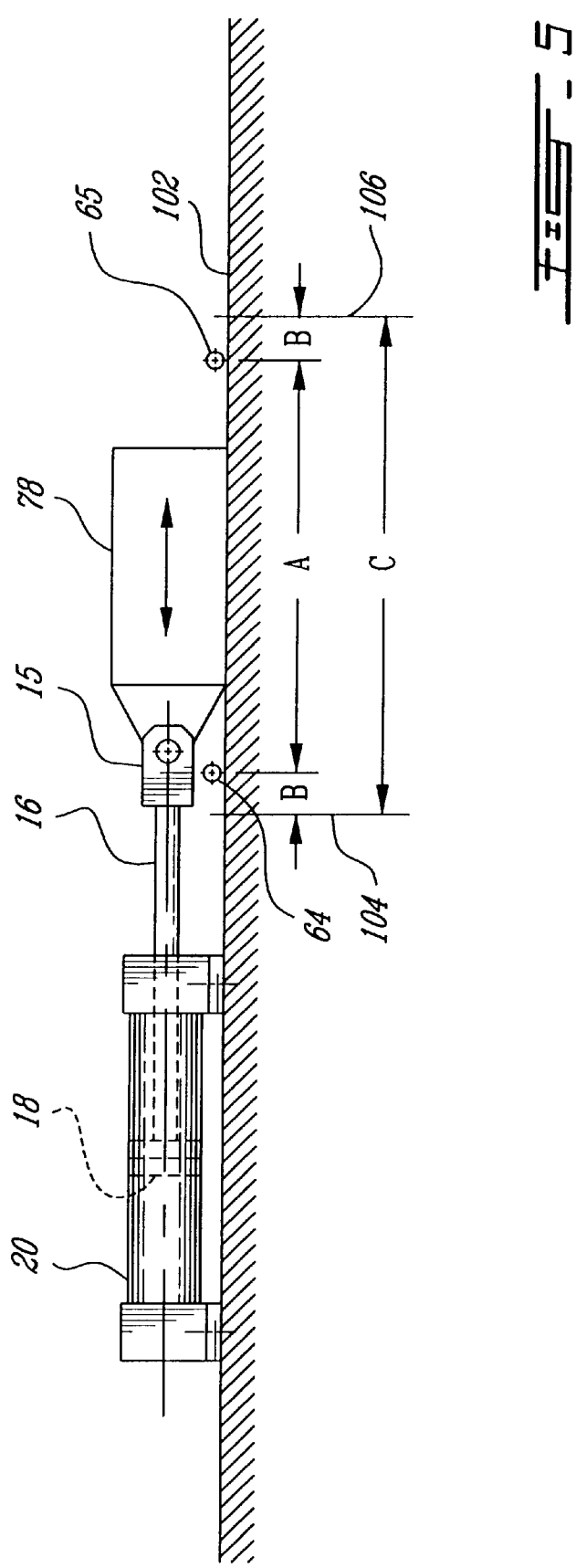
FIG. 5 shows an application using load position sensors.

FIG. 5 shows yet another embodiment of the invention, where cylinder 20 is connected to an inertia load 78 by rod clevis 15 mounted on the end of piston rod 16. Also shown are travel boundary lines 104 and 106 which indicate the maximum distance C by which load 78 may be displaced along horizontal plane 102 by the movement of cylinder piston 18. This maximum displacement comprises a length of free travel within zone A which is limited by end zones B—B inside which deceleration takes place in the direction of the boundaries 104 or 106. These deceleration zones may be unequal in length and are determined by the location of load position sensors 64 and 65 within the maximum travel zone C. In a control circuit such as in FIG. 1, a signal emitted by one of the sensors will reverse position of both venting valves 44 and 74, thus initiating back pressure build up against the piston movement in one tank and release of the accumulated pressure in the other tank. Meanwhile, the other valves in the circuit respond to the external signal which determines the stroke reversal point. In some cases this reversal signal could be provided by a second pair of load position sensors located at the ends of the load travel.

The foregoing describes an embodiment of the invention which permits, particularly on long stroke cylinder applications, to maintain unrestricted speed of piston displacement for the part of the travel which is not within the controlled end zones where back pressure is applied against the piston in response to a signal from one of the position sensors.

Although the invention has been described above with respect to a specific form, it will be evident to a person skilled in the art that it may be modified and refined in various ways. For example, in an actual installation, two four way valves with some stem modifications could be used to fulfill the same functions as the entire group of two way valves shown in FIG. 1. Although some are not shown, regulating features may be added to the system, either to control the amount of the braking force applied or the length of piston travel during which this force is applied. It is in fact possible to increase or decrease the braking force by varying the volume of the surge tank concerned. It is also possible to delay the back pressure build up in the surge tanks and the cylinder until the piston reaches a certain selected point in its travel. As explained this would only require using position sensors to cause additional signals to be sent independently to the venting valves of the surge tanks concerned. It is therefore wished to have it understood that the present invention should not be limited in scope, except by the terms of the following claims.

What is claimed is:

1. A system for producing a controlled deceleration of piston travel, at either or both ends of a piston stroke, in an air cylinder having pressure/exhaust ports, and being used to move an external load in a mostly linear path, said system comprising:
   a) an air pressure supply line to the pressure/exhaust ports of said cylinder;
   b) control valve means in said supply line causing piston travel and stroke reversal on receipt of an electrical signal; and
   c) an exhaust circuit for each cylinder port including a pressure surge tank, admission and venting valve means connected to said surge tank; said admission and venting valve means causing back pressure to be applied against said piston travel or vented to the atmosphere on receipt of an electrical signal;
      said control valve means and said admission and venting valve means causing start and reversal of said piston travel and a controlled deceleration thereof.

2. A system as defined in claim 1, further comprising signal means consisting of positionally adjustable load position sensors to independently cause the closing of the venting valve means on either pressure surge tank to thereby initiate deceleration at any selected point of the piston travel rather than at the start of said travel.

3. A system as defined in claim 1, comprising said piston moving at a decreasing rate of speed under a steady working pressure on one side and a lower but increasing pressure on the opposite side, said back pressure being generated on receipt of said electrical signal, by compression in said surge tank of the air volume being exhausted from said cylinder as it is displaced by the piston.

4. A system as defined in claim 2, wherein said load position sensors are installed along a travel path of the moving load, additionally to an external signal source, in order to independently cause the venting valve means of a first of said surge tanks to close so as to initiate back pressure build up to oppose piston movement, while at the same time signal the venting valve means of a second of said surge tanks to open so as to release the pressure accumulated in said second tank by the previous motion of the piston.

5. A system for producing a deceleration near one or both ends of the piston stroke of an air cylinder adapted for displacing a load, said cylinder having pressure/exhaust ports, said system comprising:
   a) means providing electrical signals in response to position of the load;
   b) control valve means activated by said signals and connected to said cylinder to reverse working pressure and piston travel;
   c) pressure surge tanks receiving exhaust air selectively from either port of said cylinder through admission valve means activated by said signals;
   d) venting valve means connected to said surge tanks to cause build up or release of back pressure generated at each piston stroke, said venting valve means being actuated simultaneously with said control valve means by said electrical signals.

6. A system as defined in claim 5, further comprising load position sensors for independently and selectively actuating said venting valve means.

* * * * *